(12) United States Patent
Cheng

(10) Patent No.: US 7,667,586 B2
(45) Date of Patent: Feb. 23, 2010

(54) MULTI-FUNCTIONAL ALERT SAFETY HELMET ASSEMBLY

(76) Inventor: Wen-Lung Cheng, 235 Chung-Ho Box 8-24, Taipei (TW)

( * ) Notice: Subject to any disclaimer, the term of this patent is extended or adjusted under 35 U.S.C. 154(b) by 243 days.

(21) Appl. No.: 11/954,220

(22) Filed: Dec. 12, 2007

(65) Prior Publication Data
US 2009/0153318 A1 Jun. 18, 2009

(51) Int. Cl.
*B60Q 1/34* (2006.01)
(52) U.S. Cl. ............ 340/475; 340/479; 340/432; 340/468; 340/464; 180/167; 180/169; 362/105; 362/106; 362/570
(58) Field of Classification Search .......... 340/475, 340/479, 432, 468, 464; 180/167, 169; 362/105, 362/106, 570
See application file for complete search history.

(56) References Cited

U.S. PATENT DOCUMENTS 6,784,795 B1 * 8/2004 Pories et al. ............... 340/479
6,982,633 B2 * 1/2006 Burdick .................... 340/432
7,455,139 B2 * 11/2008 Lee ........................... 180/167
2007/0285221 A1 * 12/2007 Howe et al. ................ 340/479

* cited by examiner

*Primary Examiner*—Tai T Nguyen

(57) ABSTRACT

A multi-functional alert safety helmet assembly, comprises a safety helmet having a base plate, the base plate being installed with a wireless receiving module and a control unit; the safety helmet further installed with a display panel and indication lamps which are at the base plate; and the display panel is formed by light emitting elements; two sides of the display panel having the indication lamps; the light emitting elements flashing sequentially to present textures or patterns. The base plate is connected to the display panel and indication lamps for displaying signals from the wireless transmitting module; the flash of the indication lamps are controlled by the control unit; and display of the light emitting lights of the display panel; when turning right, right indication lamps will flash and when turning left, the left indication lamps will flash.

4 Claims, 5 Drawing Sheets

MULTI-FUNCTIONAL ALERT SAFETY HELMET ASSEMBLY

FIELD OF THE INVENTION

The present invention relates to helmet, and particularly to a multi-functional alert safety helmet assembly, wherein a display panel and indication lamps are installed so as to display the state of driving, and further a wireless receiving module and a wireless transmitting module are installed for transferring message remotely.

BACKGROUND OF THE INVENTION

The safety helmet has the effect of protection the head of the driver so as to prevent from accidents. In many nations, it is required to wear the safety helmet in driving base on the traffic rules.

With the progress in technology, not only having the function of protection, the safety helmet also provides the function of air conditions so that the driver will feel comfortable.

However at night, the drivers at the rear side are not easy to adjudge whether a driver is at the front side so that accidents occur.

SUMMARY OF THE INVENTION

Accordingly, the primary object of the present invention is to provide a multi-functional alert safety helmet assembly which comprises a safety helmet having a base plate, the base plate being installed with a wireless receiving module and a control unit; the safety helmet further installed with a display panel and indication lamps which are at the base plate; the display panel is formed by light emitting elements; two sides of the display panel having the indication lamps; the light emitting elements flashing sequentially to present textures or patterns. The base plate is connected to the display panel and indication lamps for displaying signals from the wireless transmitting module; the flash of the indication lamps are controlled by the control unit; and display of the light emitting lights of the display panel; when turning right, right indication lamps will flash and when turning left, the left indication lamps will flash.

A wireless transmitting module is installed in a motorcycle and is connected to a brake and direction lights of the motorcycle; when the switch of the brake or the direction lights is pressed, the wireless transmitting module will emit signals to the wireless receiving module so that the indication lamps flash and the display panel display related messages.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
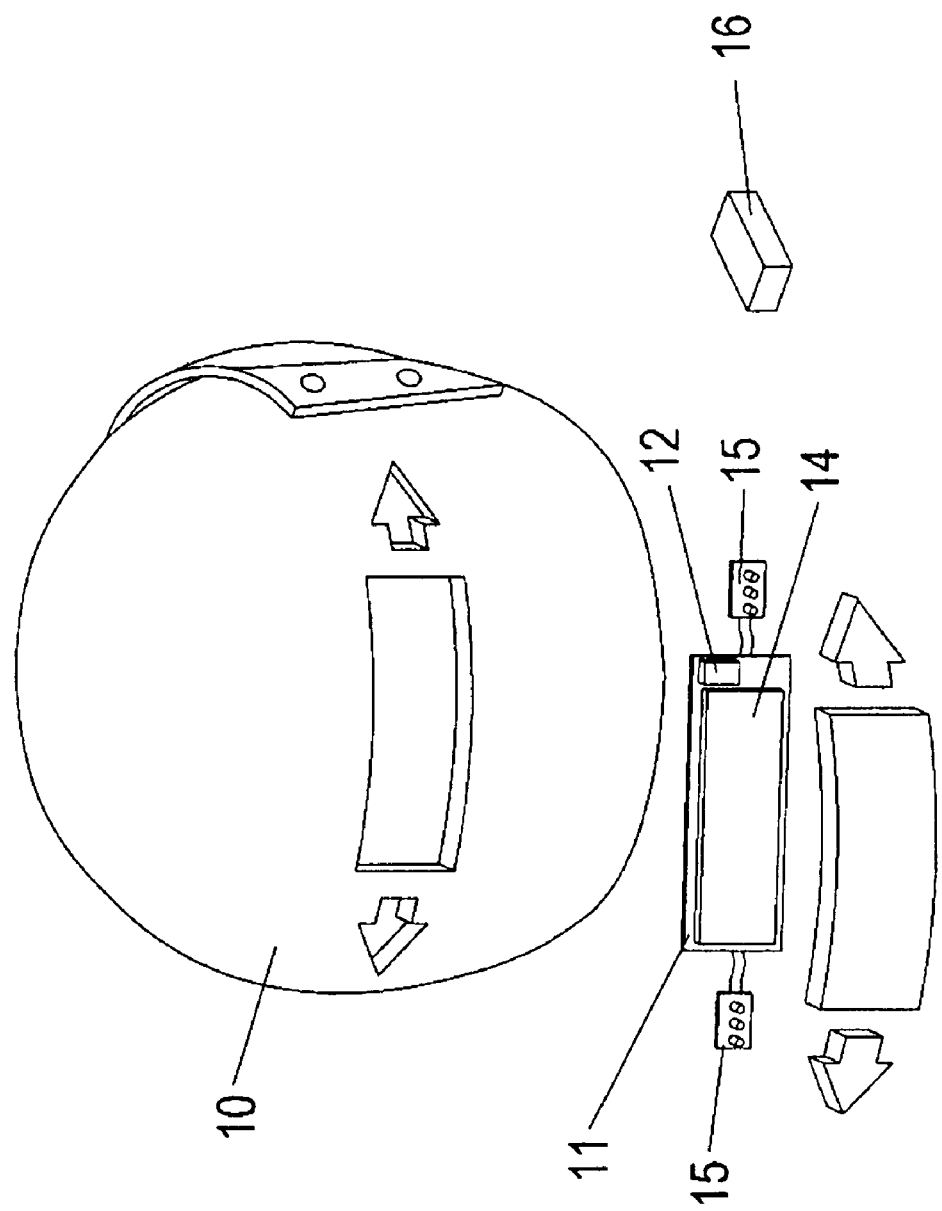
FIG. 1 is an exploded schematic view of the present invention.
Figure 2:
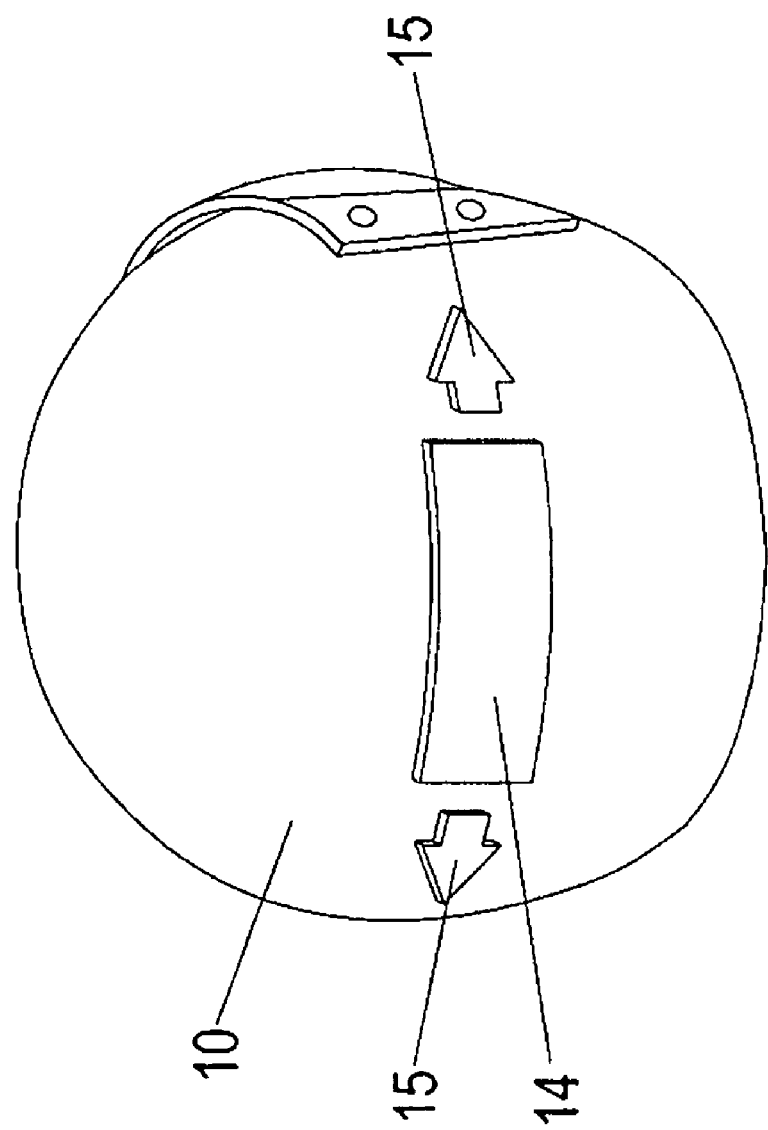
FIG. 2 is an assemble view of the present invention.
Figure 3:
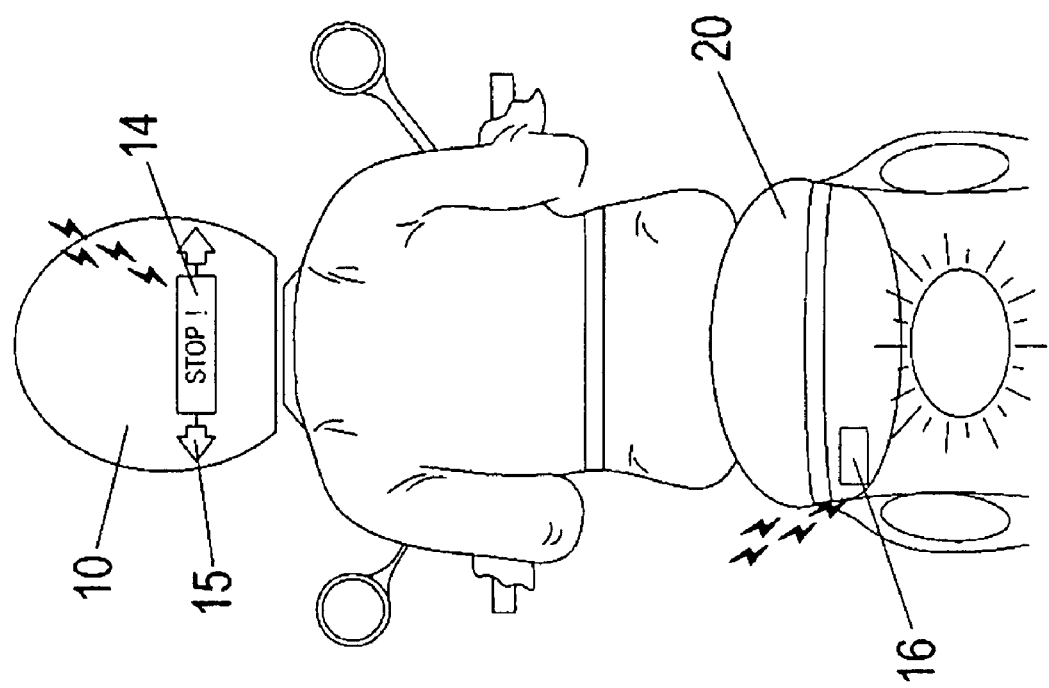
FIG. 3 shows the first embodiment of the present invention.

Referring to FIGS. 2 and 3, the multi-function alert safety helmet according to the present invention is illustrated. The present invention has the following elements.

A safety helmet 10 has a base plate 11 at a rear side thereof. The base plate 11 is installed with a wireless receiving module 12, a control unit. The safety helmet 10 is installed with a display panel 14 and indication lamps 15 which are installed on the base plate 11.

The display panel 14 is formed by a plurality of light emitting elements. The light emitting elements may be formed as textures or patterns and can be displayed sequentially.

The indication lamps 15 are distributed at the two sides of the base plate 11.

The light emitting elements of the display panel 14 may be selected from liquid crystal displays, light emitting diodes, cool light bulbs, or general bulbs Referring to FIG. 2, the display panel 14 and indication lamps 15 on the base plate 11 and the wireless transmitting module 16 serves to transfer signals to the base plate 11. The base plate 11 has a control unit for controlling the flashing effect of the indication lamps 15 and the flash sequences.

Referring to FIG. 3, one embodiment of the present invention is illustrated. The safety helmet 10 is installed with the wireless transmitting module 16. The wireless transmitting module 16 is connected to a brake light and direction lights of a motorcycle so that the driver in driving can press the switches of the brake or direction lights, the signals can be transferred to the wireless receiving module 12 from the wireless transmitting module 16. The wireless receiving module 12 may use blue tooth module or an infrared ray module for provide signals to the display panel 14 and the indication lamps 15 on the display panel 14.

Referring to FIG. 3, in driving, when the brake is pressed, the wireless transmitting module 16 of the motorcycle will emit signals to the wireless receiving module 12 of the base plate 11. The control unit on the base plate 11 will cause the display panel 14 to show the letter of "STOP" to alert the drivers at the rear side.

Figure 4:
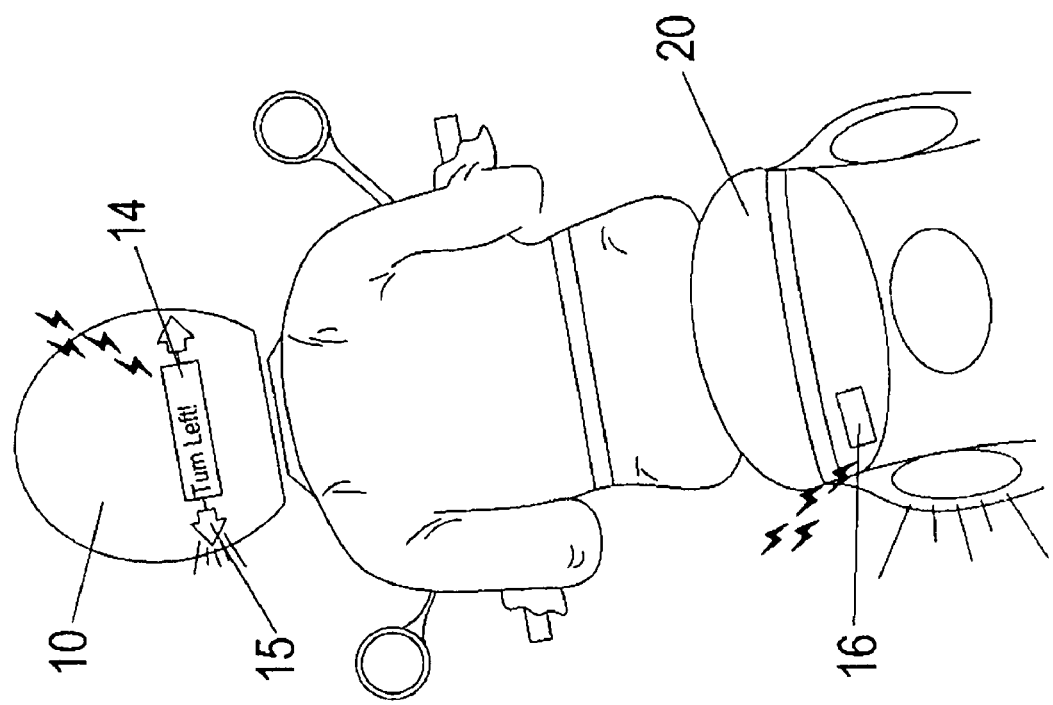
FIG. 4 shows the second embodiment of the present invention.
Figure 5:
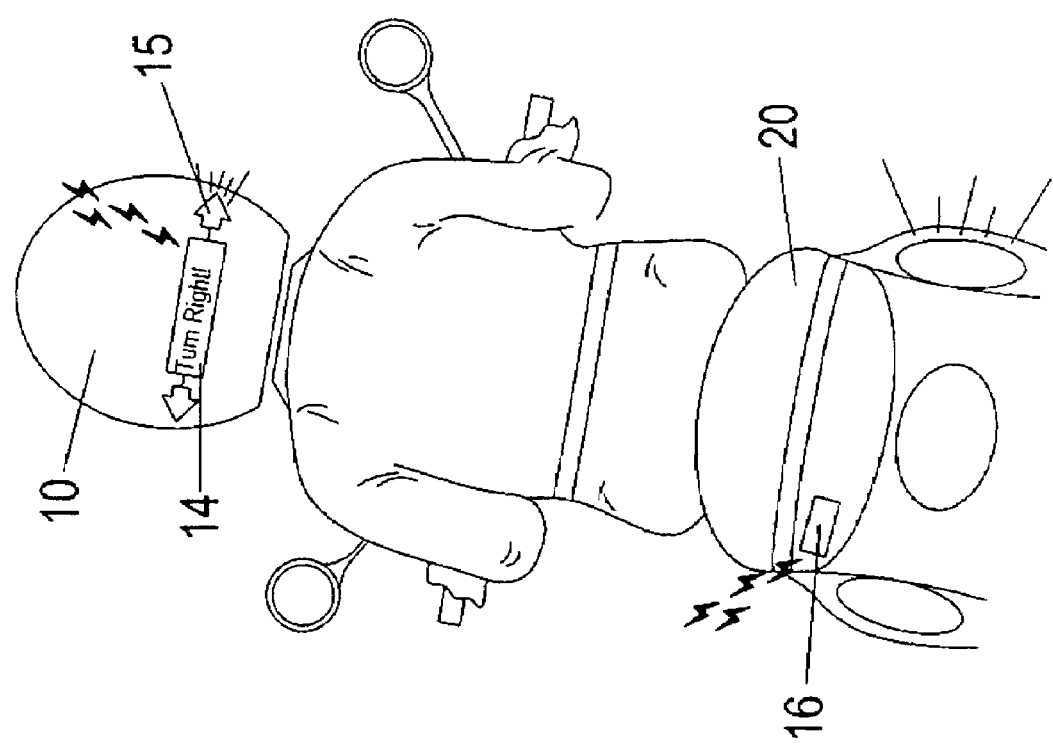
FIG. 5 shows the third embodiment of the present invention.

With referring to FIG. 4, the indication lamps 15 are at two sides of the display panel 14, it is permissible that only the indication lamps 15 at one side flash, for example when turning right, only the indication lamp 15 at right side flash and vice versa. However display panel 14 may display the word "keep attention, turning right: or others.

Advantages of the present invention are that the indication lamps are installed on the display panel of the helmet and the indication lamps can flash to have an enhance effect in alert.

The wireless transmitting module transfers signals to the wireless transmitting module so that that the turning direction or braking operation of the vehicle can be shown to the driver at the rear side.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A multi-functional alert safety helmet assembly, comprising:

a safety helmet having a base plate, the base plate being installed with a wireless receiving module, a flashing module and a control unit; the safety helmet further installed with a message display panel and indication lamps which are at the base plate;

the message display panel is formed by light emitting elements; two sides of the display panel having the indication lamps; flashing of the indicator lamps are controlled by the control unit and the light emitting elements flashing sequentially to present textures or patterns; a wireless transmitting module is installed in a motorcycle and is connected to a brake and direction lights of the motorcycle; when the switch of the brake or the direction lights is pressed, the wireless transmitting module will emit signals to the wireless receiving module so that the indication lamps flash and the display panel display related messages; and wherein the message display panel displays different textures or patterns sequentially with the flash of the indication lamps; when a right indication lamps flashes, the message display panel displays the word of "keep attention, turn right" and when a left indication lamps flashes, the message display panel displays the word of "keep attention, turn left".

2. The multi-functional alert safety helmet assembly as claimed in claim 1, wherein the wireless receiving module of the wireless receiving module is one of a Bluetooth module and an infrared module for display signals to the display panel and the indication lamps with remoter signals.

3. The multi-functional alert safety helmet assembly as claimed in claim 1, wherein the light emitting elements are selected from one of a liquid crystal display, light emitting diodes, cool light bulbs and general bulbs.

4. The multi-functional alert safety helmet assembly as claimed in claim 1, wherein the indication lamps are selected from one of a liquid crystal display, light emitting diodes, cool light bulbs or general bulbs.

* * * * *